United States Patent [19]

Ebert et al.

[11] Patent Number: 4,585,856

[45] Date of Patent: Apr. 29, 1986

[54] PROCESS FOR THE PREPARATION OF POLYARYLENE SULPHIDES

[75] Inventors: Wolfgang Ebert; Rolf-Volker Meyer; Karsten-Josef Idel, all of Krefeld; Rüdiger Schubart, Bergisch-Gladbach, all of Fed. Rep. of Germany

[73] Assignee: Bayer Aktiengesellschaft, Leverkusen-Bayerwerk, Fed. Rep. of Germany

[21] Appl. No.: 768,575

[22] Filed: Aug. 23, 1985

Related U.S. Application Data

[63] Continuation of Ser. No. 607,961, May 7, 1984, abandoned.

[30] Foreign Application Priority Data

May 17, 1983 [DE] Fed. Rep. of Germany ....... 3317820

[51] Int. Cl.$^4$ .............................................. C08G 75/14
[52] U.S. Cl. ................................ 528/388; 264/331.11; 264/331.12
[58] Field of Search ................... 528/388; 264/331.11, 264/331.12

[56] References Cited

U.S. PATENT DOCUMENTS

| 3,869,434 | 3/1975 | Campbell et al. | 528/388 |
| 3,919,177 | 11/1975 | Campbell | 528/388 |
| 4,071,509 | 1/1978 | Edmonds, Jr. | 528/388 |
| 4,373,090 | 2/1983 | Edmonds, Jr. | 528/388 |
| 4,500,702 | 2/1985 | Ostlinning et al. | 528/388 |
| 4,501,884 | 2/1985 | Ostlinning et al. | 528/388 |
| 4,525,579 | 6/1985 | Idel et al. | 528/388 |
| 4,535,149 | 8/1985 | Ebert et al. | 528/388 |
| 4,537,951 | 8/1985 | Idel et al. | 528/388 |

FOREIGN PATENT DOCUMENTS 1078538 8/1967 United Kingdom .

*Primary Examiner*—Melvyn I. Marquis
*Attorney, Agent, or Firm*—Connolly and Hutz

[57] ABSTRACT

This invention relates to a new process for the preparation of optionally branched polyarylene sulphides from optionally substituted halogen benzenes in admixture with aromatic polyhalogen compounds and alkali metal sulphides in polar solvents in the presence of thio salts.

9 Claims, No Drawings

PROCESS FOR THE PREPARATION OF POLYARYLENE SULPHIDES

This is a continuation of application Ser. No. 607,961 filed May 7, 1984 and now abandoned.

This invention relates to a new process for the preparation of optionally branched polyarylene sulphides from optionally substituted halogen benzenes in admixture with aromatic polyhalogen compounds and alkali metal sulphides in polar solvents in the presence of thio salts.

Polyarylene sulphides are known (see U.S. Pat. Nos. 3,648,941 and 2,513,188). They may be prepared from the corresponding aromatic halogen compounds and alkali metal or alkaline earth sulphides. Thus, for example, monomeric and polymeric sulphides may be prepared by the process described in U.S. Pat. No. 3,354,129 of reacting at least one cyclic compound containing a double bond between adjacent ring atoms and substituted by at least one halogen atom with an alkali metal sulphide in a polar solvent. Polyhalogen compounds may be used as branching agents.

DE-AS No. 2,453,749 discloses the use of carboxylates as reaction accelerators and the additional use of thio compounds as sulphur donors. DE-OS No. 2,623,363 and U.S. Pat. No. 4,038,261 disclose the use of lithium chloride or lithium carboxylates as catalyst for the preparation of arylene sulphide polymers.

According to U.S. Pat. No. 4,038,259, alkali metal carbonates are used in combination with alkali metal carboxylates, and according to U.S. Pat. No. 4,038,263 lithium halides are used as catalysts for the preparation of polyphenylene sulphides. According to DE-OS No. 2,623,362 and U.S. Pat. No. 4,038,262, lithium halides or alkali metal carboxylates are used together with carbon dioxide and alkali metal hydroxides as catalysts for the preparation of arylene sulphide polymers.

U.S. Pat. No. 4,038,260, for example, discloses the use of alkali metal sulphonates while U.S. Pat. No. 4,039,518 discloses the use of lithium carbonate and lithium borate as catalysts.

Polyarylene sulphides with reduced melt flow may be obtained when trialkali metal phosphate catalysts (DE-OS No. 2,930,710) or alkali metal phosphonate catalysts (DE-PS No. 2,930,797) are used.

According to DE-OS No. 2,623,333, the water of hydration of the lithium acetate used as catalyst is first removed and the water of hydration of the sodium sulphide hydrate is then removed in a subsequent step.

A stage of hardening or curing by means of a chain lengthening and branching reaction is generally employed for p-polyphenylene sulphides (e.g. U.S. Pat. Nos. 3,727,620, 3,524,835, 3,839,301). Without this hardening step, p-polyphenylene sulphides generally have a very low melt viscosity which virtually forbids thermoplastic processing.

U.S. Pat. No. 4,116,947 and DE-OS No. 2,817,731 describe how a certain quantity of residual water enables p-polyphenylene sulphides to be spun into fibres and extruded or moulded without being first hardened.

This state of the art generally presupposes the use of alkali metal carboxylates, and the reaction mixture contains certain quantities of water. Moreover, the quantities in which these catalysts are used are far greater than conventional catalytic quantities and almost amount to equimolar quantities. In addition, the use of alkali metal hydroxides in quantities of up to 20 mol percent is necessary.

It has now been found that polyarylene sulphides may be obtained in high yields without the addition of alkali metal carboxylates if the preparation of the polyarylene sulphides is carried out in the presence of small quantities of thio salts.

The polyarylene sulphides obtained by such means are distinguished by their exceptionally high melting points, which indicate increased crystallinity and a high degree of purity.

The present invention thus provides a process for the preparation of optionally branched high molecular weight polyarylene sulphides having improved dimensional stability under heat from (a) dihalogen benzenes, of which 0 to 100 mol percent, preferably 50 to 100 mol percent, correspond to formula (I):

and 0 to 100 mol percent, preferably 0 to 50 mol percent, correspond to formula (II):

wherein
X represents halogens, such as flourine, chlorine or bromine in the meta or para positions relative to each other, and
$R^1$ may be identical or different at each position and represents hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl and if two groups $R^1$ are in the ortho position to each other, they may be linked together to form an aromatic or heterocyclic 5- to 10-membered ring which may obtain up to three hetero atoms such as O, N or S, and in all cases at least one of the groups $R^1$ is a substituent other than hydrogen, and (b) 0 to 5.0 mol percent preferably 0.1 to 2.0 mol percent, based on the sum of the aromatic dihalogen compounds of formulae (I) and (II), of an aromatic trihalogen or tetrahalogen compound of formula (III):

$$ArHal_n \qquad (III)$$

wherein
Ar represents an aromatic or heterocyclic group with 6 to 24 carbon atoms which may contain up to three hetero atoms such as N, O or S,
Hal represents a halogen such as flourine, chlorine, bromine or iodine, and
n represents the integer 3 or 4, and (c) alkali metal sulphides, preferably sodium or potassium sulphide or mixtures thereof, optionally in the form of their hydrates, optionally together with alkali metal hydroxides such as sodium or potassium hydroxide, the molar ratio of (a+b): c lying within the range of from 0.85:1 to 1.15:1, preferably from 0.95:1 to 1.05:1, (d) in a polar solvent, optionally in the presence of cosolvents, with the molar ratio of (c) to (d) lying within the range of from 1:2 to 1:15, characterised in that the above mentioned components are reacted together in the presence of thio salts of formula (IV):

   (IV)

wherein
R represents $C_1$–$C_{20}$ alkyl, $C_5$–$C_{20}$ cycloakyl, $C_6$–$C_{24}$ aryl or $C_7$–$C_{24}$ aralkyl, the cycloalkyl or aryl or aralkyl groups optionally having 1 to 3 ring carbon atoms replaced by hetero atoms such as N or O,
X represents a single bond, O, S or

wherein $R^1$ represents hydrogen or the meanings indicated for R, and R and $R^1$ may also be members of a common optionally heterocyclic ring having 5 to 7 ring members,
Z represents O and/or S, and
M represents an n-valent cation from the group of alkali metals and/or alkaline earth metals, e.g. $Na^+$, $K^+$, $mg^{2+}$ or $Ca^{2+}$ or an ammonium cation $[NR_4^1]^+$ in which $R^1$ may be hydrogen or represent any of the meanings indicated for R, and two or more groups $R^1$ may also be members of one and the same, optionally heterocyclic ring having 5 to 7 ring members, and
n=1, 2 or 3.

The following are examples of dihalogen benzenes of formula (I) which may be used according to the invention: p-difluorobenzene, p-dichlorobenzene, p-dibromobenzene, 1-fluoro-4-chlorobenzene, 1-fluoro-4-bromobenzene, 1-chloro-4-bromobenzene, m-difluorobenzene, m-dichlorobenzene, m-dibromobenzene and 1-chloro-3-bromobenzene. Any of these may be used alone or in admixture with others in this list.

The following are examples of dihalogen benzenes of formula (II) which may be used according to the invention: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene and 1,4-dichloroanthraquinone. These may also be used singly or in admixture with each other.

The following are examples of aromatic polyhalogen compounds of formula (III) to be used according to the invention: 1,2,3-trichlorobenzene, 1,2,4-trichlorobenzene, 1,2,4-tribromobenzene, 1,2,4-triiodobenzene, 1,3,5-trichloro-2,4,6-trimethyl benzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2',4,4'-tetrachlorobiphenyl, and 1,3,5-trichlorotriazine.

Polar solvents which ensure sufficient solubility of the organic and inorganic reactants under the reaction conditions may be used for the process according to this invention. Lactams and amides are preferred, and N-alkyl lactams are particularly preferred.

The following are examples of suitable solvents: dimethyl formamide, dimethyl acetamide, caprolactam, N-methyl caprolactam, N-ethyl caprolactam, N-isopropyl caprolactam, N-methyl-2-pyrrolidone, N-ethyl-2-pyrrolidone, N-isopropyl-2-pyrrolidone, N-methyl-3-methyl-2-pyrrolidone, N-methyl-5-methyl-2-pyrrolidone, N-methyl-3,4,5-trimethyl-2-pyrrolidone, N-methyl-2-piperidone, N-ethyl-2-piperidone, N-methyl-6-methyl-2-piperidone, and N-methyl-3-ethyl-2-piperidone.

Mixtures of the above mentioned solvents may also be used.

The alkali metal sulphides used may be prepared from hydrogen sulphide or alkali metal hydrogen sulphides and stoichiometric quantities of alkali metal hydroxides by neutralisation in or outside the reaction solution. When pure alkali metal sulphides are used, alkali metal hydroxides may be added to neutralise any alkali metal hydrogen sulphides present.

The following are examples of thio salts according to the invention represented by formula (IV):

(a) alkali metal and alkaline earth metal salts of thiocarboxylic acid corresponding to the general formula (V):

   (V)

wherein R, M and n have the meaning indicated in formula (IV), e.g.

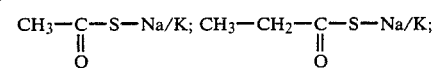

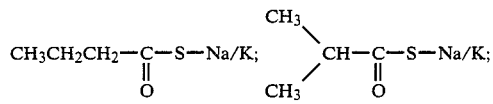

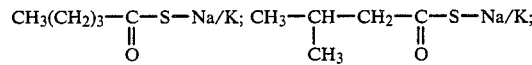

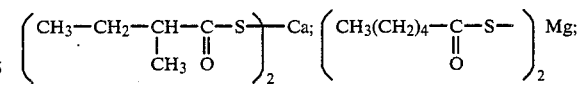

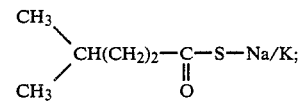

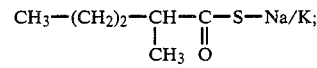

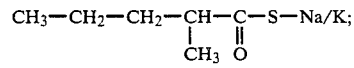

-continued

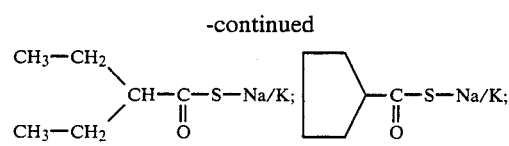

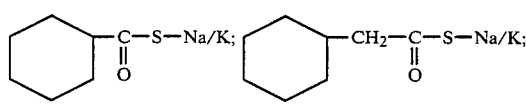

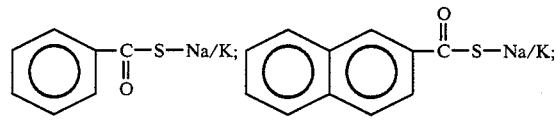

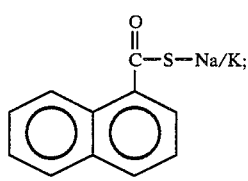

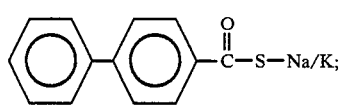

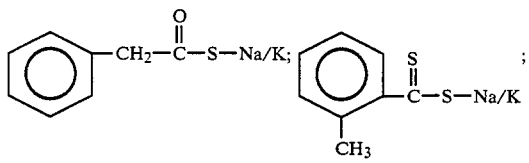

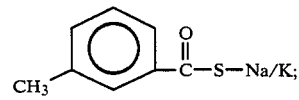

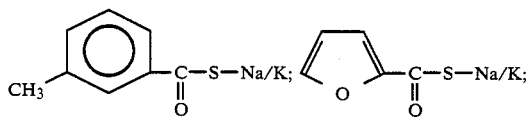

the sodium salts of thioacetic acid, thiopropionic acid, thiobutyric acid, thiophenylacetic acid and thiobenzoic acid being preferred;

(b) salts of dithiocarboxylic acids corresponding to formula (VI):

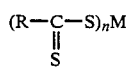

wherein R, M and n have the meaning indicated for formula (IV), e.g.

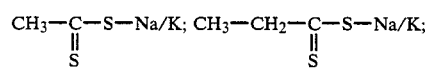

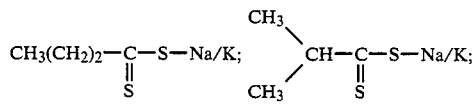

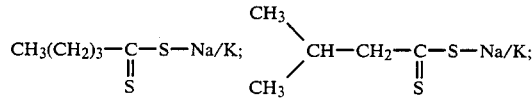

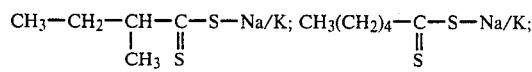

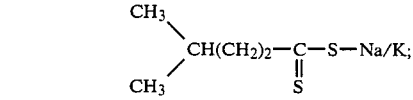

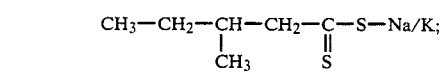

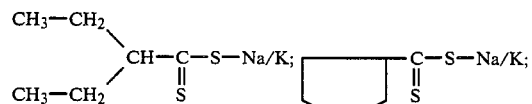

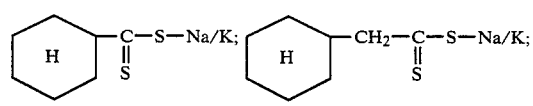

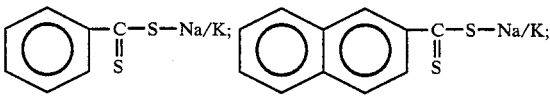

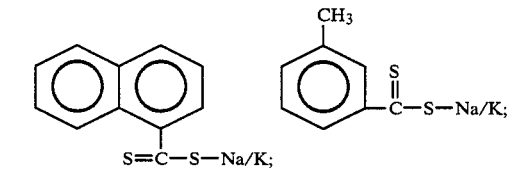

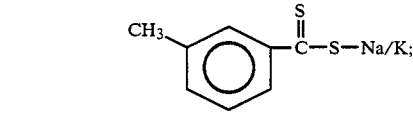

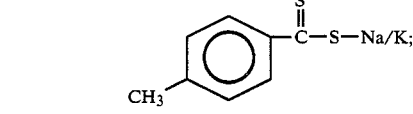

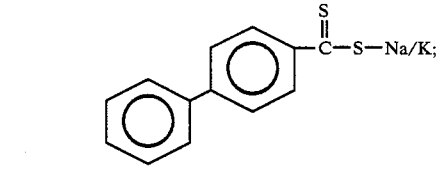

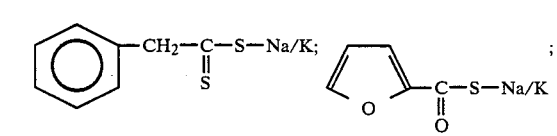

The alkali metal salts of dithioacetic acid and/or of dithiophenylacetic acid are preferably used;

(c) xanthates of formula (VII), such as the sodium and potassium salts of xanthic acids:

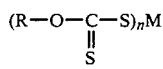 (VII)

wherein R, M and n have the meaning indicated for formula (IV) e.g. methyl xanthate, i-propyl-, n-butyl-, (2-methyl-propyl)-, (1-methyl-propyl)-, tertiary butyl-, pentyl, (3-methylbutyl)-, (2-methylbutyl)-, (1-methylbutyl)-, (1-ethylpropyl)-, cyclopropyl-, (3-methylcyclopentyl)-, cyclopentylcyclohexyl-, phenyl-, 1-naphthyl-, 2-naphthyl-, (o-cresyl)-, (m-cresyl)-, (p-cresyl)- and benzyl xanthate and

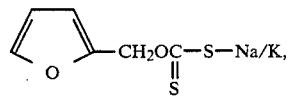

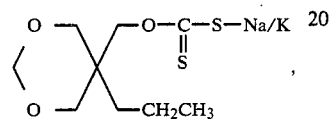

the methyl, ethyl, propyl, butyl, benzyl and phenyl xanthates being preferred.

(d) alkali metal salts of monotrithio carbonic acid esters of formula (VIII):

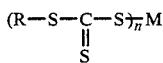 (VIII)

wherein R, M and n have the meaning indicated for formula (IV), e.g.

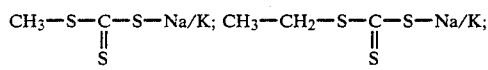

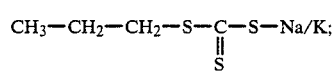

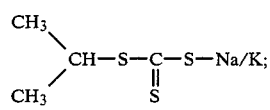

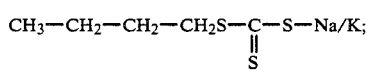

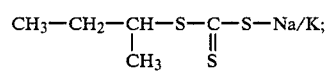

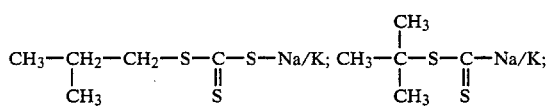

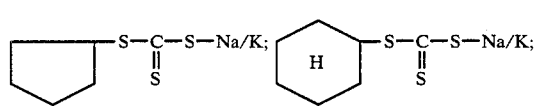

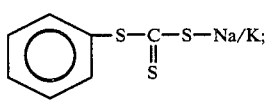

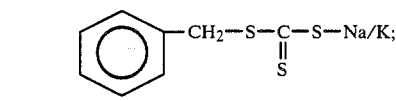

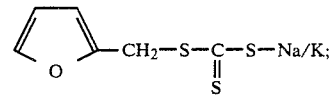

preferably the salts of the monoethyl ester of trithio carbonic acid;

(e) alkali metal or ammonium salts of dithiocarbamic acid corresponding to formula (IX):

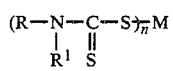 (IX)

wherein R, R¹, M and n have the meaning indicated for formula (IV), e.g. the following compounds:

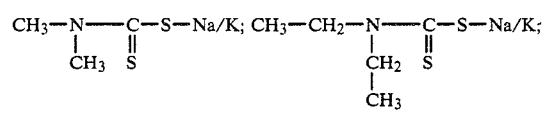

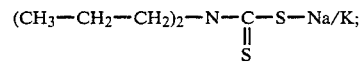

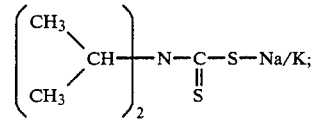

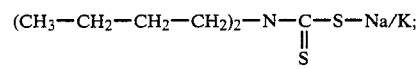

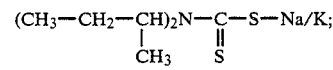

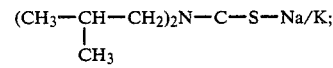

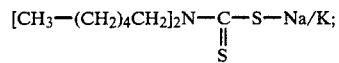

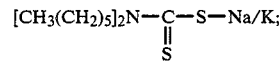

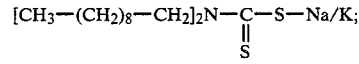

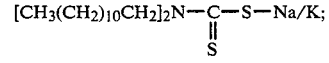

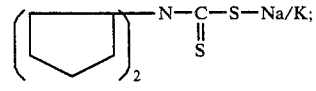

-continued
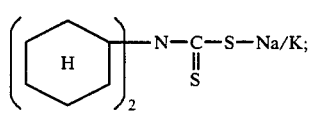
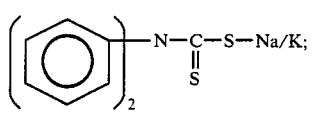
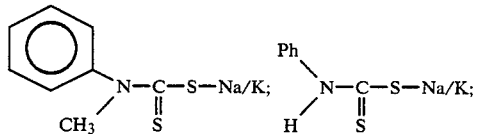
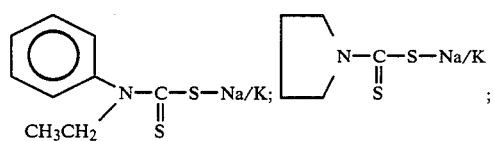
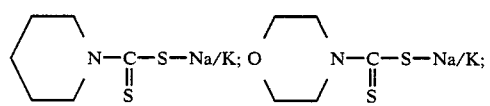
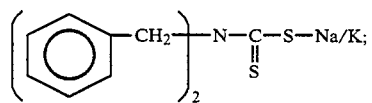
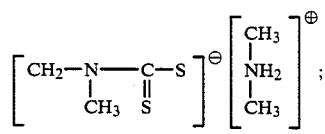
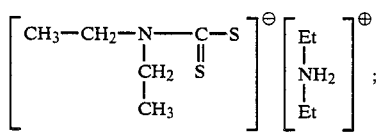
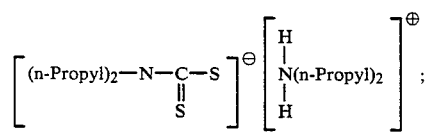
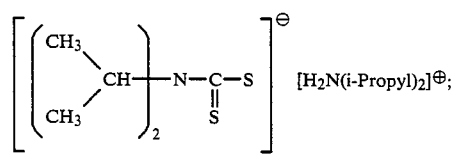
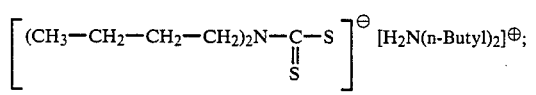
-continued
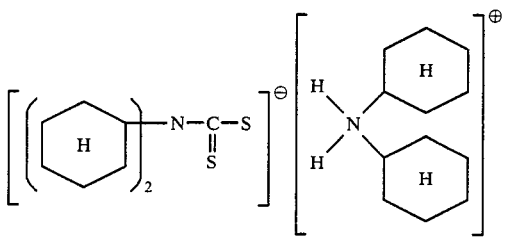
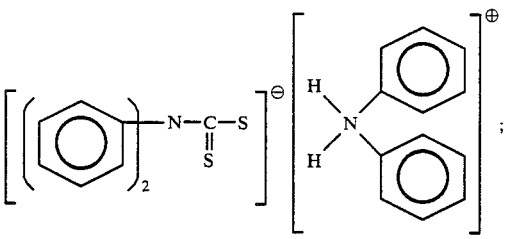
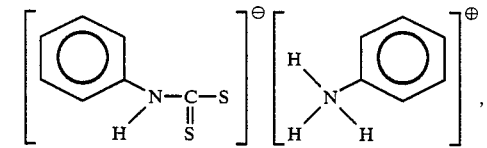
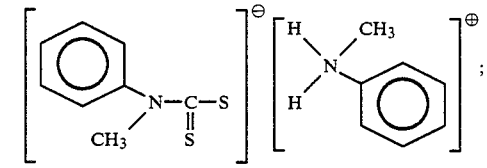
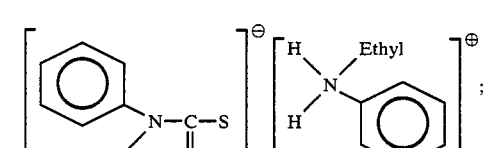
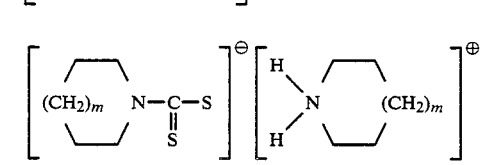
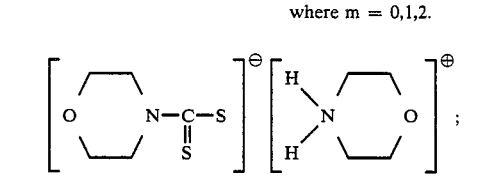
where m = 0,1,2.
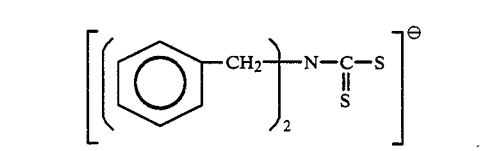
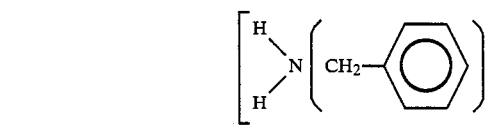

The following compounds preferably being used:

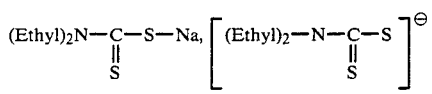

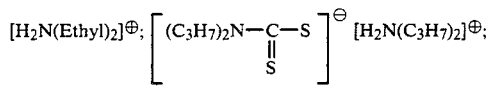

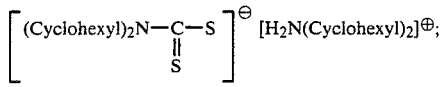

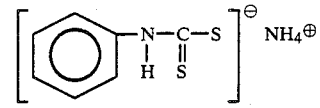

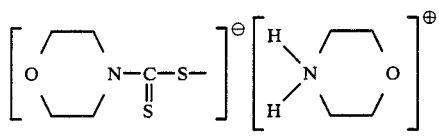

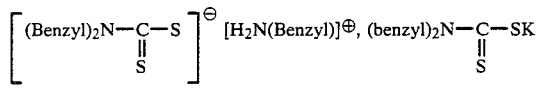

In the process according to the invention, the compounds corresponding to formula (IV) may be used singly or as mixtures of several of these compounds. Xanthates and dithiocarbamates are preferred.

The thio salt corresponding to formula (IV) is generally used in quantities of from 0.001 to 0.5 mol, preferably from 0.005 mol to 0.15 mol, per mol of alkali metal sulphide.

The reaction temperature is from 160° C. to 295° C., preferably from 190° C. to 275° C.

The reaction (polycondensation) time may vary widely. It may amount to as much as 30 hours but is preferably from 0.2 to 15 hours.

The process according to the invention may be carried out as follows:

The dihalogen benzene or mixtures of dihalogen benzenes, optionally in admixture with an aromatic polyhalogen compound, and the alkali metal sulphide and disulphides may be mixed in any form in the polar solvent to be used according to the invention and reacted therein. It may be advantageous to remove most of the water which may be present in the form of water of hydration of the alkali metal sulphides and/or as mixing component of the aqueous solutions of the sulphides used according to the invention before the dihalogen benzene and thio salts are added.

Thus when using alkali metal sulphides containing water of hydration, the reaction mixture advantageously contains less than 1.0 mol of water, preferably less than 0.5 mol of water per mol of alkali metal sulphide. Such a low water content may be achieved, for example, by preliminary drying of the starting compounds, for example by dehydrating the alkali metal sulphides of the reaction mixture by azeotropic distillation (e.g. with toluene or xylene) before the reaction. Alkali metal sulphides are preferably used in a dehydrated form, whereby the process is considerably simplified.

If the reaction temperature of the polycondensation according to the invention is higher than the boiling point of the solvent, the reaction may be carried out under pressure. Step-wise increase of the reaction temperature during the reaction may be advantageous.

The dihalogen benzene and alkali metal sulphide are reacted in approximately equimolar proportions. The molar ratio of dihalogen benzene:alkali metal sulphide lies in the range of from 0.85:1 to 1.15:1, preferably in the range of from 0.95:1 to 1.05:1.

The aromatic polyhalogen compounds of formula (III) to be used according to the invention may be added in quantities of several mol percent, based on the quantity of dihalogen benzene. A proportion of up to 5.0 mol percent, preferably from 0.1 to 2.0 mol percent, based on the quantity of dihalogen benzene, is generally sufficient. When aromatic polyhalogen compounds are used, the polyarylene sulphides obtained are branched.

The quantity of solvent used may be chosen within a wide range and is generally from 2 to 15 mol per mol of alkali metal sulphide.

In the conventional processes, it is necessary to add a substantial quantity of alkali metal hydroxide to the sodium sulphide to neutralise any alkali metal hydrogen sulphide still present, but this may be omitted in the process according to the invention.

Working up of the reaction mixture may be carried out by various methods.

The polyarylene sulphide may be directly isolated from the reaction solution by the usual methods such as filtration or centrifuging or only after the addition of, for example, water and/or dilute acids. Filtration is generally followed by washing with water. Washing or extraction with other washing liquids may also be carried out, either at the same time as the washing with water or subsequently.

The polymer may also be obtained by evaporation of the solvent from the reaction chamber, followed by washing as described above.

If the process according to the invention is carried out at normal pressure, the polyarylene sulphides are obtained in yields of about 80% to 90%. In the known processes, such yields can only be obtained with the aid of technically elaborate pressure reactions.

When polyarylene sulphides are prepared by the process according to the invention, the quantities of catalyst required are substantially less than those required for the known processes. Whereas carboxylates are used in approximately equimolar quantities (based on the alkali metal sulphide) in the known processes, only a few mol percent are required for the process according to the invention.

Another advantage over the known processes is that the volumetric yield of the reaction is improved. Thus the conventional processes are normally carried out in an approximately 20% solution in N-methyl pyrrolidone, based on the quantity of sodium sulphide, whereas the process according to the invention may be carried out in an approximately 30% solution.

The polyarylene sulphides prepared by the process according to the invention are highly pure. This is manifested by their very high melting ranges (up to 320° C.). Such polyarylene sulphides are distinguished by their increased dimensional stability under heat and they are therefore particularly interesting for many technical fields of application, in particular in electrical engineering, electronics and for use within the engine of motor vehicles.

EXAMPLES

Example 1

49.24 g (0.373 mol) of sodium sulphide ($\times 3H_2O$) are introduced into a reaction vessel together with 50 ml of water and 300 ml of toluene and gasified with nitrogen, and the water is subsequently removed azeotropically. Additional toluene must be introduced several times to ensure complete removal of water. 150 ml of N-methyl pyrrolidone (NMP) are then added and the reaction mixture is heated to the boiling point of NMP in a stream of nitrogen to remove the residues of toluene. 56.85 g (0.387 mol) of p-dichlorobenzene and 2.69 g of sodium methyl xanthate (5 mol percent) are then added and the reaction mixture is boiled under reflux in a stream of nitrogen for 12 hours.

The reaction product is isolated by taking it up with dilute hydrochloric acid, suction filtering and washing with water, dichloromethane and ethanol. 33 g (81.8% of theoretical yield) of polyphenylene sulphide, melting range 272°–283° C., are obtained after 12 hours drying under vacuum at 100° C.

Example 2

30.3 g (0.373 mol) of sodium sulphide (containing 0.178 mol $H_2O$) are heated under reflux for 12 hours together with 56.85 g (0.387 mol) of p-dichlorobenzene. 2.07 g of

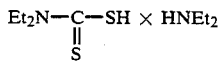

(2.5 mol percent) and 150 ml of N-methyl pyrrolidone. The product is worked up as in Example 1. 34 g of polyphenyl sulphide (84.28% of theoretical yield), melting range 278°–289° C., are obtained.

Example 3

61.4 g (0.467 mol) of sodium sulphide ($\times 3H_2O$) are dehydrated with xylene under nitrogen as in Example 1 and taken up with N-methyl pyrrolidone. 7.4 g (0.094 mol) of acetyl chloride dissolved in 30 ml of N-methyl pyrrolidone are then introduced drop-wise over a period of 15 minutes to prepare 0.094 mol of sodium thioacetate. 56.85 g (0.387 mol) of 1,4-dichlorobenzene are then added and the reaction mixture is boiled under reflux for 12 hours. The product is worked up as in Example 1, 34 g (84.28% of theoretical yield) of polyphenylene sulphide, melting range 282°–288° C., being obtained.

Example 4

29.66 g (0.373 mol) of sodium sulphide $\times 0.085$ mol $H_2O$ together with 150 ml of N-methyl pyrrolidone, 56.85 g (0.387 mol) of p-dichlorobenzene and 5.4 g (5 mol %) of

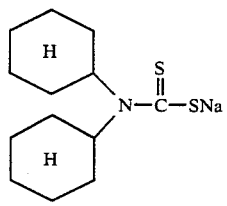

are boiled at reflux under nitrogen for 12 hours. The product is worked up as in Example 1. 33 g of polyphenylene sulphide (81.8% of theoretical yield), melting range 285°–292° C., are obtained.

Example 5

29.66 g (0.373 mol) of sodium sulphide $\times 0.085$ mol $H_2O$, 56.85 g (0.387 mol) of 1,4-dichlorobenzene and 6.24 g (5 mol percent) of

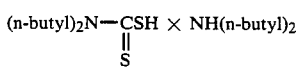

are boiled at reflux in 150 ml of N-methyl pyrrolidone for 12 hours in a stream of nitrogen. The product is worked up as in Example 1. 33.5 g (83.0% of theoretical yield) of polyphenylene sulphide, melting range 261°–267° C., are obtained.

Example 6

30.9 g (0.373 mol) of sodium sulphide $\times 0.17$ mol $H_2O$, 56.85 g (0.387 mol) of 1,4-dichlorobenzene and 3.48 g (5 mol percent) of

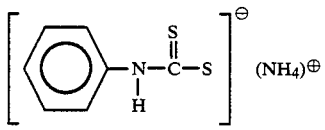

in 150 ml of N-methyl pyrrolidone are heated under reflux in a stream of nitrogen for 12 hours. The product is worked up as in Example 1. 34 g (84.3% of theoretical yield) of polyphenylene sulphide, melting range 295°–300° C., are obtained.

We claim:

1. A process for the preparation of high molecular weight polyarylene sulphides from reactants consisting of:

(a) dihalogen benzenes, 0 to 100 mol percent of which correspond to formula (I):

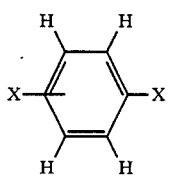

and 100 to 0 mol percent to formula (II):

$$\begin{array}{c} R^1 \quad R^1 \\ X \underset{R^1 \quad R^1}{\overset{}{\bigcirc}} X \end{array} \quad (II)$$

wherein

X represents halogen in the meta or para positions relative to each other, and $R^1$ is identical or different at each position and represents hydrogen, $C_1$–$C_{20}$ alkyl, $C_7$–$C_{24}$ alkaryl, $C_7$–$C_{24}$ aralkyl, or two groups $R^1$ which are in the ortho positions relative to each other linked together to form an aromatic or heterocyclic 5- to 10-membered ring containing up to three O, N or S hetero atoms, and in all cases at least one of the groups $R^1$ is different from hydrogen, and (b) 0 to 5.0 mol percent, based on the sum of the aromatic dihalogen compounds of formulae (I) and (II), of an aromatic trihalogen or tetrahalogen compound of formula (III):

$$\text{ArHal}_n \quad (III)$$

wherein

Ar represents an aromatic group having 6 to 24 carbon atoms or heterocyclic group having 6 to 24 carbon atoms with up to three N, O or S hetero atoms, Hal represents halogen, and n represents the number 3 or 4, and (c) alkali metal sulphides, with the molar ratio of (a+b):c lying within the range of from 0.85:1 to 1.15:1, and in the presence of (d) a polar solvent, with the molar ratio of (c) to (d) within the range of from 1:2 to 1:1.15, characterized in that the components (a) to (c) are reacted together in the presence of 0.005 to 0.15 mole of thio salts, per mole of alkali metal sulphide, corresponding to formula (IV):

$$(R-X-\underset{\underset{Z}{\|}}{C}-S-)_m M \quad (IV)$$

wherein

R represents $C_1$–$C_{20}$ alkyl, $C_5$–$C_{20}$ cycloalkyl, $C_6$–$C_{24}$ aryl, $C_7$–$C_{24}$ aralkyl, or heterocycles corresponding to said cycloalkyl, aryl or aralkyl groups wherein 1 to 3 ring carbon atoms are replaced by N or O hetero atoms, X represents a single bond, O, S, or $$-\underset{|}{N}-R^1$$

wherein $R^1$ is as defined above,

Z represents O or S, and

M represents an n-valent cation from the group of alkali metals, alkaline earth metals, or an ammonium cation of the formula $[NR_4^1]^+$ wherein $R^1$ is as defined above, and m = 1, 2 or 3.

2. A process according to claim 1 characterized in that the alkali metal sulphides of component (c) are in the form of their hydrates.

3. A process according to claim 1, characterized in that the alkali metal sulphides of component (c) are mixed with alkali metal hydroxides.

4. A process according to claim 1, characterised in that the compounds of formula (IV) used are salts of thiocarboxylic acids.

5. A process according to claim 1, characterised in that the compounds of formula (IV) used are salts of dithiocarboxylic acids.

6. A process according to claim 1, characterised in that the compounds of formula (IV) used are xanthates.

7. A process according to claim 1, characterised in that the compounds of formula (IV) used are salts of monotrithio-carbonic acid esters.

8. A process according to claim 1, characterised in that the compounds of formula (IV) used are salts of dithiocarbamic acid.

9. A process according to claim 1, characterised in that the reaction mixture contains less than 1 mol of water per mol of alkali metal sulphide.

* * * * *